United States Patent
Friedrichs et al.

(10) Patent No.: US 8,040,227 B2
(45) Date of Patent: Oct. 18, 2011

(54) METHOD FOR DETECTING MOVING OBJECTS IN A BLIND SPOT REGION OF A VEHICLE AND BLIND SPOT DETECTION DEVICE

(75) Inventors: Fabian Friedrichs, Stuttgart (DE); Muhammad Siddiqui, Stuttgart (DE); Klaus Zimmermann, Deizisau (DE)

(73) Assignee: Sony Deutschland GmbH, Berlin (DE)

( * ) Notice: Subject to any disclaimer, the term of this patent is extended or adjusted under 35 U.S.C. 154(b) by 632 days.

(21) Appl. No.: 12/114,239

(22) Filed: May 2, 2008

(65) Prior Publication Data

US 2008/0309516 A1    Dec. 18, 2008

(30) Foreign Application Priority Data

May 3, 2007   (EP) .................................. 07008959

(51) Int. Cl.
*B60Q 1/00*     (2006.01)
(52) U.S. Cl. ........ 340/436; 340/435; 340/937; 382/104; 382/107
(58) Field of Classification Search .......... 340/903–904, 340/435, 436, 937; 700/300–301; 382/104, 382/107, 173
See application file for complete search history.

(56) References Cited

U.S. PATENT DOCUMENTS

| 5,521,633 | A | 5/1996 | Nakajima et al. | |
| 6,678,413 | B1 * | 1/2004 | Liang et al. | 382/181 |
| 2003/0141762 | A1 | 7/2003 | Sartori et al. | |
| 2007/0047809 | A1 * | 3/2007 | Sasaki | 382/170 |
| 2008/0166018 | A1 * | 7/2008 | Li et al. | 382/105 |

FOREIGN PATENT DOCUMENTS

| EP | 1 562 146 A2 | 8/2005 |
| JP | 2000-285245 | 10/2000 |
| WO | WO 01/61371 A2 | 8/2001 |
| WO | WO 01/85491 A1 | 11/2001 |
| WO | WO 2004/021546 A2 | 3/2004 |
| WO | WO 2004/099742 A2 | 11/2004 |

OTHER PUBLICATIONS

Luigi Di Stefano, et al., "Vehicle Detection and Tracking Using the Block Matching Algorithm", Recent Advances in Signal Processing and Communications; World Scientific and Engineering Academy and Society, XP-007903993, 1999, pp. 160-165.
U.S. Appl. No. 12/098,640, filed Apr. 7, 2008, Friedrichs, et al.

\* cited by examiner

*Primary Examiner* — Daniel Wu
*Assistant Examiner* — Nay Tun
(74) *Attorney, Agent, or Firm* — Oblon, Spivak, McClelland, Maier & Neustadt, L.L.P.

(57) ABSTRACT

A method for detecting moving objects in a blind spot of vehicle is provided, comprising: taking a sequence of images of said blind spot region, partitioning each of said images of said sequence into blocks, identifying moving blocks which have moved between consecutive images of said sequence, determining a direction and a distance of said movement of said moving blocks; grouping adjacent moving blocks, for which directions within a predetermined direction interval and distances within a predetermined distance interval have been determined, and determining said moving objects based on said step of grouping. A corresponding blind spot detection device is provided as well.

18 Claims, 11 Drawing Sheets

METHOD FOR DETECTING MOVING OBJECTS IN A BLIND SPOT REGION OF A VEHICLE AND BLIND SPOT DETECTION DEVICE

The invention relates to a method for detecting moving objects in a blind spot region of a vehicle, a blind spot detection device and to a computer program product.

BACKGROUND

For vehicles it is known that even with rear view mirrors a certain region in the back of the driver of the vehicle, i.e. a blind spot region, cannot be observed easily. In case of lane changes of the vehicle dangerous situations can occur, when a moving object in the blind spot region, for instance another vehicle which is intending to passing on the nearby lane, is not observed by the driver of the vehicle.

Thus, automotive manufacturers are currently investigating safety applications to introduce blind spot information systems to the vehicles. Such blind spot information systems are currently based on active sensors like radar, sonic and LIDAR (laser scanner). Infrared or stereo cameras are often used, since they provide information about the depth. Video is also considered but mainly for front view applications.

It is an object of the invention to provide an improved method and device to detect moving objects in a blind spot region of a vehicle.

The object is solved by a method, a blind spot detection device and a computer program product.

Further embodiments are defined in the dependent claims.

Further details of the invention will become apparent from a consideration of the drawings and ensuing description.

DETAILED DESCRIPTION

In the following, embodiments of the invention are described. It is important to note that all described embodiments in the following may be combined in any way, i.e. there is no limitation that certain described embodiments may not be combined with others.

Figure 1:
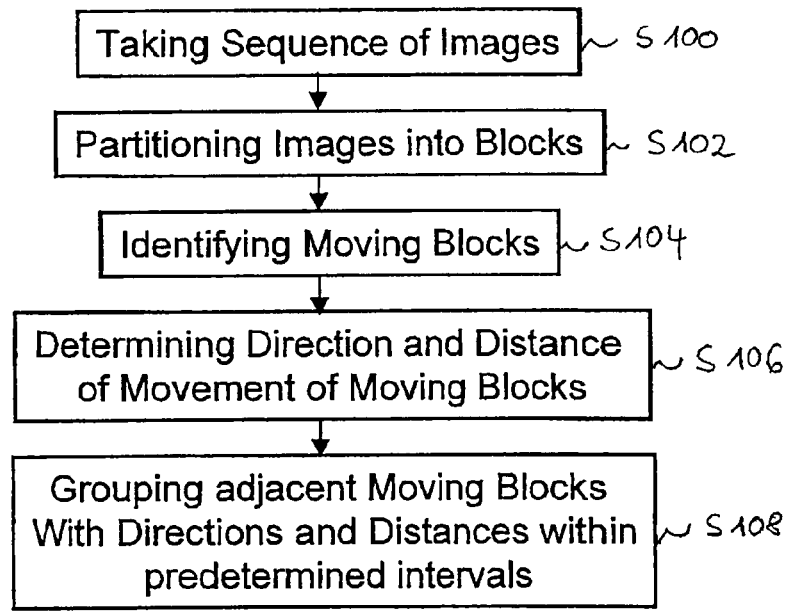
FIG. 1 shows main steps of one embodiment of the invention.

In FIG. 1, in step S100 a sequence of images is taken, e.g. by a video camera mounted on a vehicle in order to take said sequence of images of a blind spot region, situated near by the vehicle. Said images might also be referred to by "frames" or "fields".

In step S102, the images of said sequence are partitioned into blocks, e.g. into blocks with 8×8 pixels each or with 16×16 pixels each, but different block sizes or block shapes are also within the scope of the present invention.

In step S104 moving blocks are identified which have moved between consecutive images of said sequence. This might be performed by evaluating the sum of absolute differences of pixel values from a block compared to corresponding blocks of subsequent images in said sequence or by evaluating other known error measures like cross correlation or mean squared errors.

In step S106 a distance and a direction of the movement is determined, e.g. by comparing the position of the moving blocks in consecutive images.

In step S108, adjacent blocks within an image are grouped, for which directions within a predetermined direction interval and distances within a predetermined distance interval have been determined. The predetermined direction interval and the predetermined distance interval are used to detect a movement in basically the same direction by basically a same distance. The predetermined intervals might be fixed or might be adaptive, e.g. to the actual directions or distances of said moving blocks. This movement might also be determined by calculating a motion vector between blocks of consecutive images and comparing said motion vectors.

Such grouped adjacent blocks are considered a moving object in said blind spot region of the vehicle. Instead the wording "grouping" also the wordings "segmenting", "segmentation" or "clustering" might be used within this description.

In an embodiment at least one false alarm is determined among said moving objects and an alarm is generated only if at least one of said moving objects is no false alarm. Such false alarms might otherwise disturb the driver of a vehicle which no longer would trust the blind spot detection or might result in accidents and injuries.

In a further embodiment an object size of said moving object is determined and compared with a predetermined size. A false alarm is generated if said object size is smaller than said predetermined size. Small objects are not considered to be a danger for a moving vehicle so that no alarm has to be created, if only such small objects are situated in a blind spot region of the vehicle. Small objects below a predetermined size might be no vehicles.

In a further embodiment a vanishing point within said images is determined and said predetermined size depends on a distance of said moving object from said vanishing point. The vanishing point within an image normally is used as a point in a perspective drawing to which parallel lines appear to converge. Also in image processing this point can be determined. Objects nearby the vanishing point of an image have a smaller size within the image than objects which appear to be nearer to the vehicle.

Objects nearby a vanishing point appear smaller and therefore are processed differently.

In a further embodiment the vanishing point within the images is identified, an object size of the moving object is determined and a vertical distance of the moving object from said vanishing point is determined. Objects that are small and high above a vanishing point are normally no danger within a blind spot region of a vehicle, because these objects are not situated on a nearby lane but somewhere in the sky.

In a further embodiment histogram and/or edge-based statistical measures of at least one of said moving objects is calculated, evaluated and a false alarm is generated based on said step of evaluating. Such histogram and/or edge-based statistical measures might comprise a variance, an inter quarter range (IQR), a mean, a median, an energy, an edge energy, a uniformity, a smoothness, a third moment and/or an entropy. Such statistical measures are known from describing images and can be used to classify moving objects. For example, road signs normally show two peaks in a histogram, one at a low luminance value and another one at a high luminance value. Road signs are considered not to be a threat for a vehicle, so that a corresponding false alarm is generated.

In a further embodiment the trajectory of said moving object is evaluated and the false alarm is generated based on said step of evaluating. Normally noise occurs for only short time instances and such noise has no trajectory. A detection of a moving object might only be considered if the number of trajectory points of the last frames have also been detected as moving objects and the average motion of these frames is positive.

In a further embodiment a size of the moving object is determined and a difference between a region surface and a convex hull of said moving object is calculated, if said size is greater than a predetermined size. The moving object is redefined, if said difference is above a predetermined difference. If a region of a moving object is too large and has too many concave parts, it has to be considered further, e.g. it might be divided into a plurality of moving objects.

According to a further embodiment, said images of said sequence are split into at least two regions. Normally there are very small objects with very low motion near to the vanishing point and on the other hand, there are very large and very fast moving objects in a nearer or front part of the image. So the different areas of the image have different properties. Each region can be treated appropriately with splitting the image into at least two regions. The location where to split depends on a camera mounting angle or the vanishing point, respectively. For instance, when the image is split into two regions this location can be somewhere between the middle and one third of the image width. The regions should overlap slightly, to avoid border problems and obtain less abrupt changes between the regions.

Figure 2:
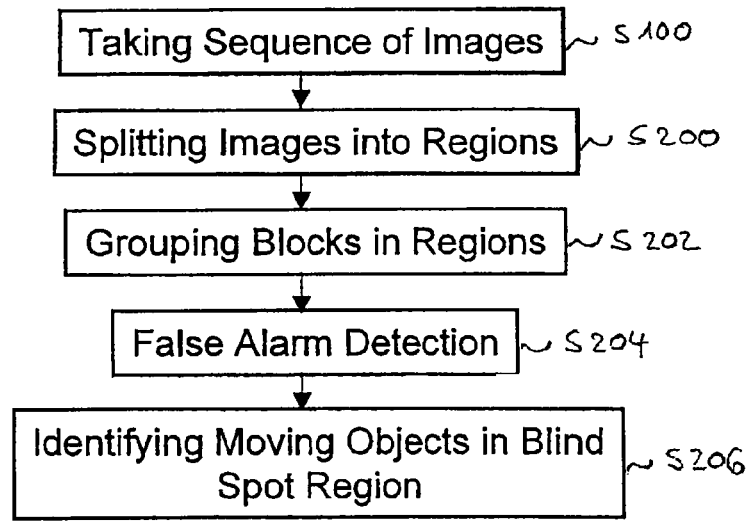
FIG. 2 shows steps according to a further embodiment of the invention including false alarm detection and splitting images into regions.

As it is depicted in FIG. 2, in a step S200 the images are split into regions, the blocks are grouped in the regions in a step S202 and false alarm detection is adapted according to the different regions in a step S204. Within this embodiment the motion estimation and the used algorithms can be adapted better to the different properties within the regions. The search range of the motion estimation may be adapted to the region as well as a match block size. For instance, the search range and match block size in the region with the vanishing point is lower than in the region without the vanishing point.

In a further embodiment the training data for a classification is different in all regions, since the perspective is changing. Obstacles in the region with the vanishing point are seen from the front, whereas obstacles in the right area, i.e. the region without the vanishing point are seen from the side.

According to a further embodiment, the different regions can be cropped or re-sampled to different resolutions, thereby reducing computation time in case of down-scaling, i.e. using less pixels, and allowing sub-pixel accuracy in case of up-scaling, i.e. calculating additional pixel value in-between the measured pixel values.

Figure 3:
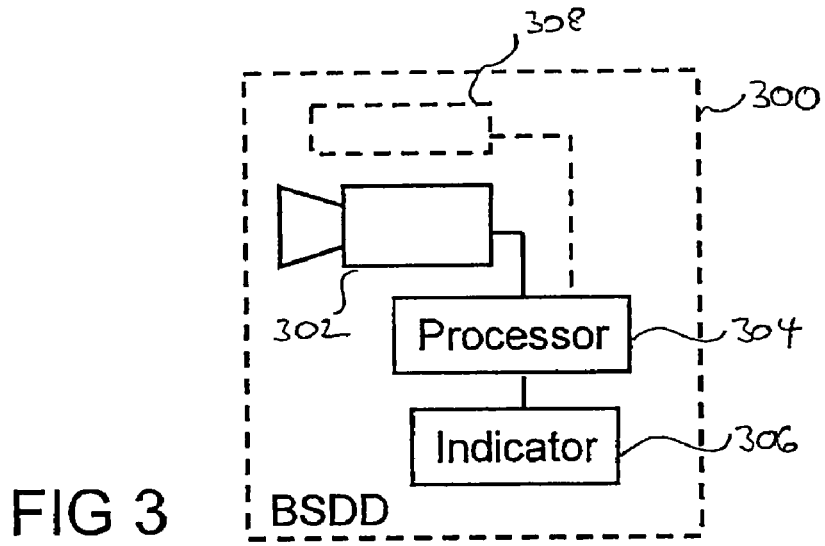
FIG. 3 shows a blind spot detection device according to one embodiment of the invention.

In FIG. 3 an embodiment of blind spot detection device 300 is depicted, which comprises a camera 302, a processor 304 and an indicator 306. The camera 302 is configured to take a sequence of images of the blind spot region. As a camera 302 a monocular camera may be used for the proposed method and system.

The processor 304 is configured to partition each of said images of said sequence into blocks, to identify moving blocks that have performed a movement between consecutive images of said sequence, to determine a direction and a distance of said movement of said moving blocks, to group adjacent moving blocks, for which directions within a predetermined direction interval and distances within a predetermined distance interval have been determined and to determine said moving objects.

The indicator 306 is configured to indicate a dangerous situation, if a moving object in said blind spot region has been detected. Such indicator might be an alarm sound or an optical signal, e.g. light emitting diode (LED), which is blinking or is emitting light continuously.

The blind spot detection device might also comprise active sensors 308 (showed optionally in FIG. 3) based on Radar, Lidar, GPS (Global Positioning System) or ultra-sonic to verify the blind spot detection devices with said active sensors.

Figure 4:
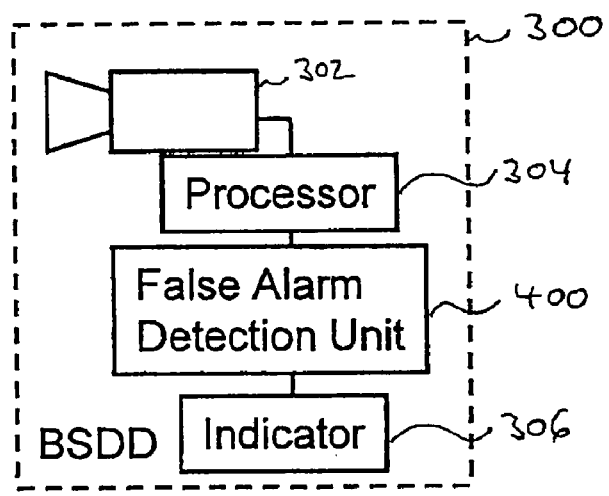
FIG. 4 shows another embodiment of a blind spot detection device with a false alarm detection unit.

In FIG. 4 a further embodiment of a blind spot detection device 300 is depicted wherein additionally a false alarm detection unit 400 is connected to the processor 304 and to the indicator 306. The false alarm detection unit is configured to identify false alarms amongst said moving objects and the indicator 306 is further configured to generate an alarm if at least one of said moving objects is no false alarm.

Figure 5:
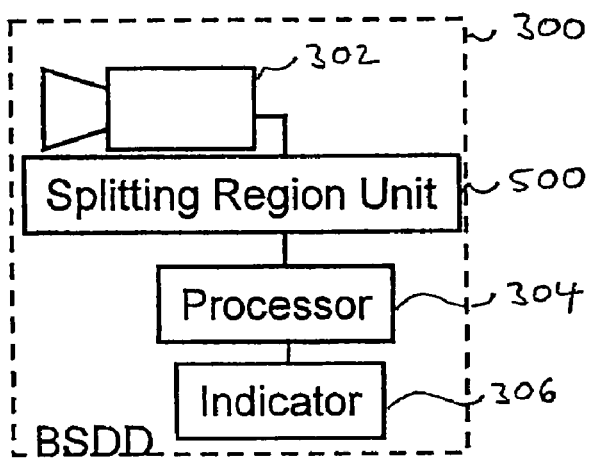
FIG. 5 shows a further embodiment of a blind spot detection device with a splitting region unit.

In FIG. 5 a further embodiment of a blind spot detection device is depicted which additionally comprises a splitting region unit 500 that is connected to the camera 302 and to the processor 304. The splitting region unit 500 is configured to split the images of said sequence into at least two regions.

Figure 6:
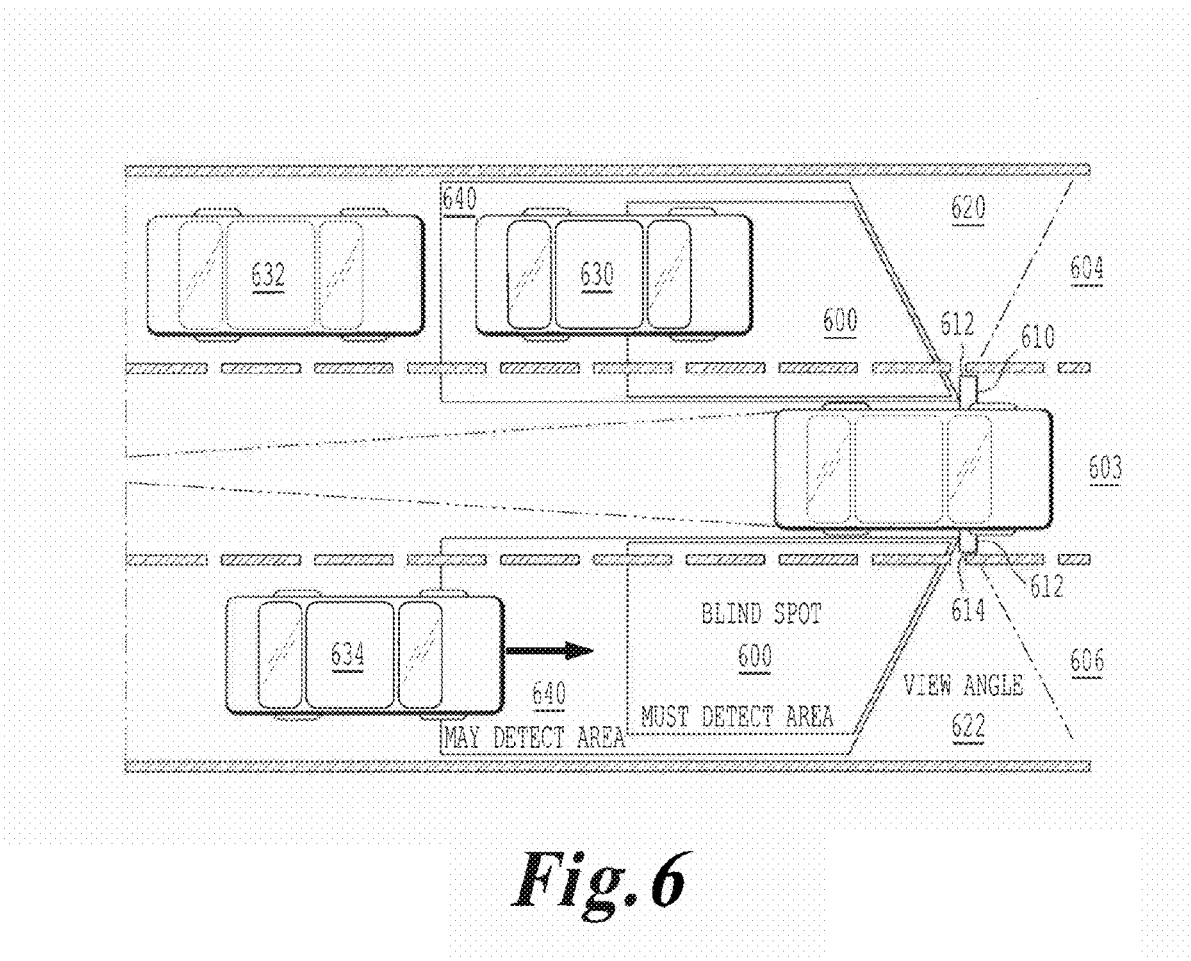
FIG. 6 shows a top view of the vehicle equipped with a blind spot detection device according to a further embodiment of the invention.

In FIG. 6 a top view of a blind spot region 600 of a vehicle 602, which is driving on a middle lane 603 of a three-lane road is depicted together with a left lane 604 and a right lane 606. A left camera 610 is mounted on a left rear view mirror 612 and a right camera 613 is mounted on a right rear view mirror 614. The left camera 610 has a left view angle 620 and the right camera 613 has a right view angle 622. A first vehicle 630 and a second vehicle 632 behind said first vehicle 630 are driving on the left lane 604. On the right lane 606 a third vehicle 634 is approaching the blind spot region 600. A "may detect area" 640 is also shown. The blind spot region 600 and the may detect area 640 are part of the left view angle 620 and the right view angle 622. When a vehicle, like the first vehicle 630 is inside the blind spot region 600, it is considered as a threat, no matter what velocity it has. As soon as a vehicle, like the third vehicle 634, enters the may detect area 640 it should be detected by the blind spot detection device. The third vehicle 634 is considered as a threat if its velocity is too high.

A vehicle, like the second vehicle 632, that is outside the may detect area 640 is not classified as a threat but may also be tracked.

The blind spot detection device detects vehicles 630, 632, 634 in the blind spot region 600 using a single camera sensor mounted on the own vehicle 602. The blind spot 600 on the left side and the right side are handled similar. If a vehicle like the first vehicle 630 is in the blind spot region 600 or other vehicles like the second vehicle 634 are about to enter the blind spot region 600 with high velocity the driver of the own vehicle 602 is warned by an optical sign (e.g. a light emitting diode LED) or by an acoustic signal if the driver intends to change the lanes.

Figure 7:
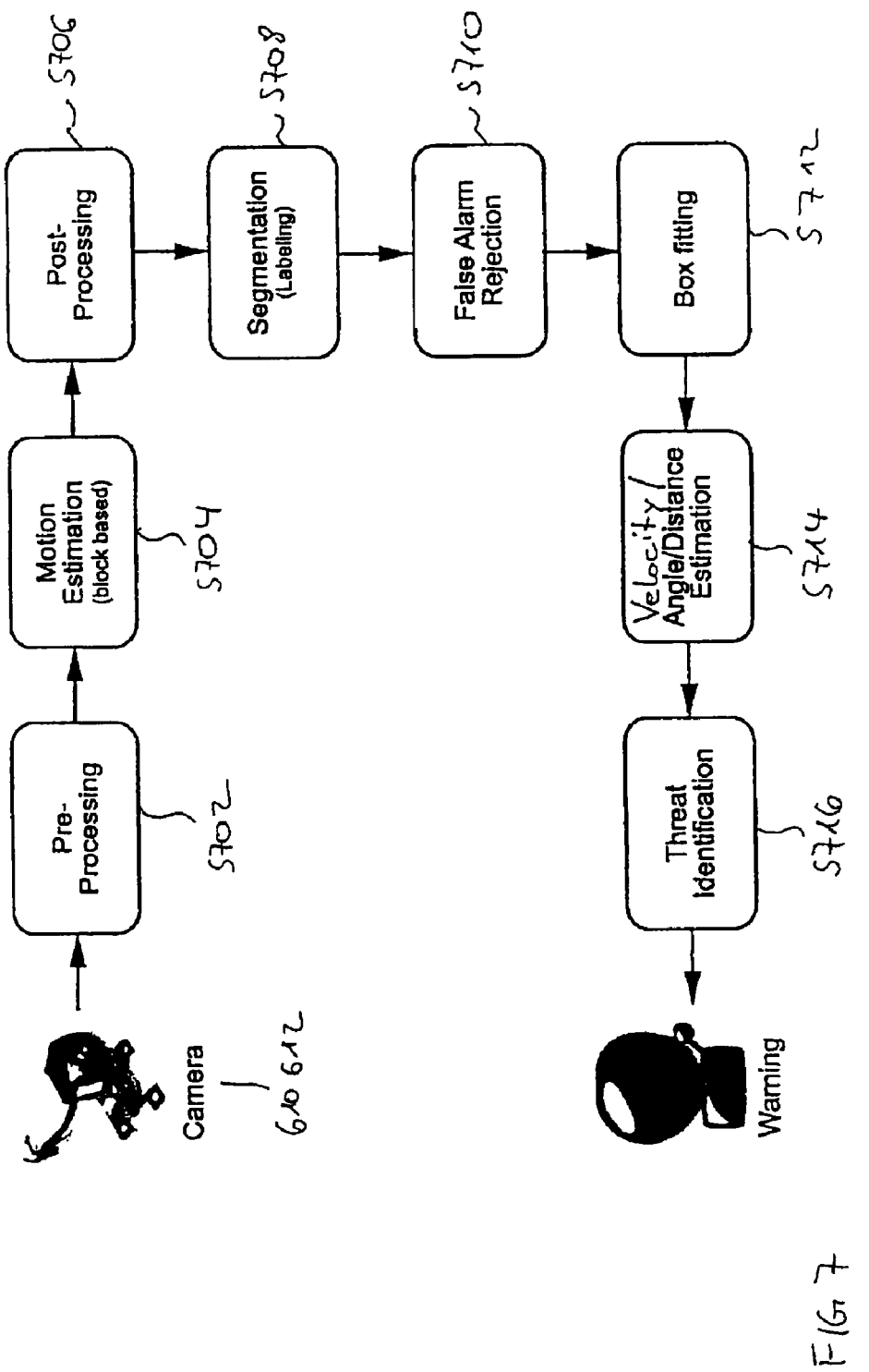
FIG. 7 shows more detailed steps according to another embodiment of the invention.

The block diagram in FIG. 7 depicts the processing steps of the proposed approach. A camera 610, 612 takes the sequence of images, which are afterwards preprocessed in a step S702, for example by filtering. In a step S704 a block-based motion estimation is performed which is post-processed in a step S706. Blocks which move in the same direction or have the same motion vector are segmented or grouped to moving objects in a step S708. In the step S710 false alarms among the moving objects are detected. Afterwards a box fitting step S712 is performed as an abstract model of the vehicle to which it is fitted to find contact points to a road plane for an angle/distance/velocity estimation that is performed in step S714. Afterwards a threat or danger is identified in step S716 and a corresponding warning is initiated e.g. an acoustic signal is given. The angle/distance/velocity estimation S714 helps to identify objects in a distance which is not dangerous.

Figure 8:
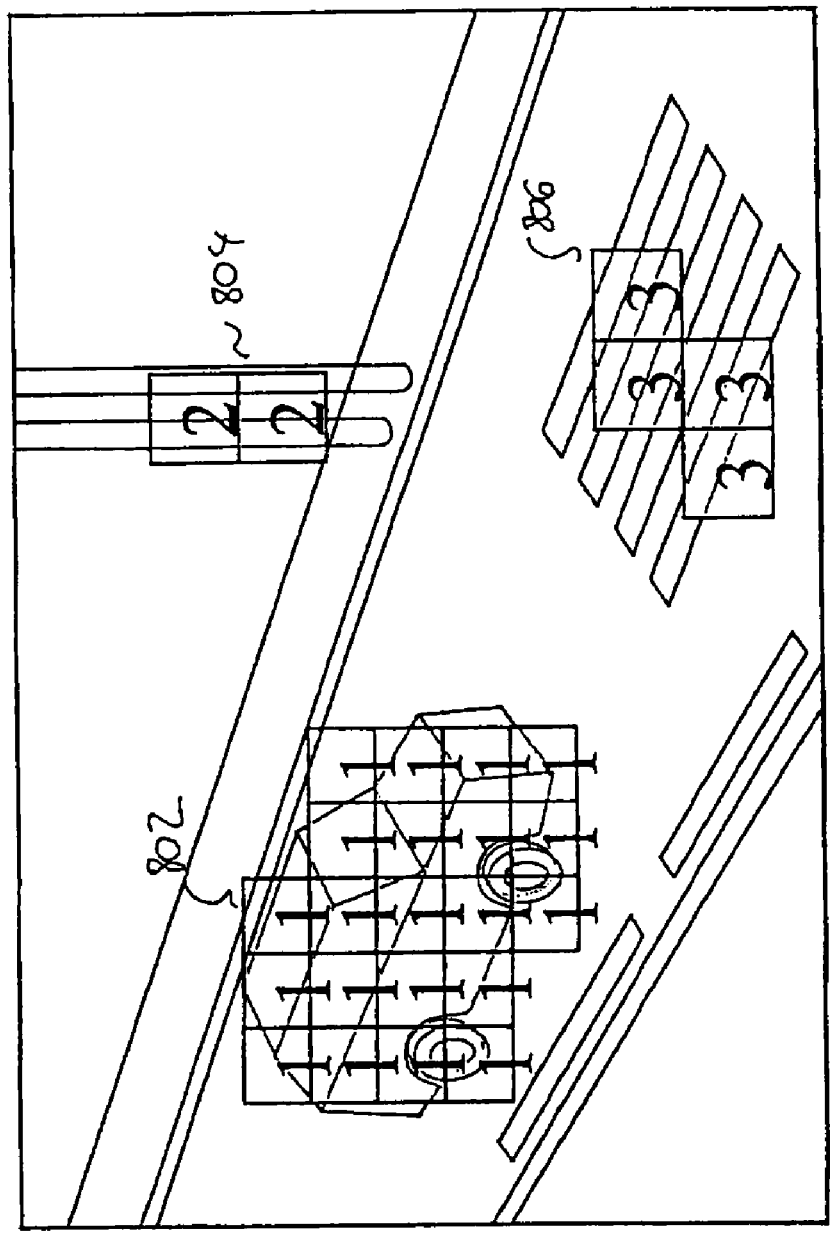
FIG. 8 shows an exemplary diagram to illustrate false alarms.

In FIG. 8 an image with grouped blocks is depicted. Adjacent blocks with the same motion vector are labeled with the same numbers (1, 2, 3). Different regions are each labeled with individual numbers. It is not known after this grouping or segmenting step, if the region is either a successful detection, as it is the case for the vehicle 802 or a false alarm, as it is the case with the post 840 of a road sign 804 or a crosswalk sign 806.

Figure 9:
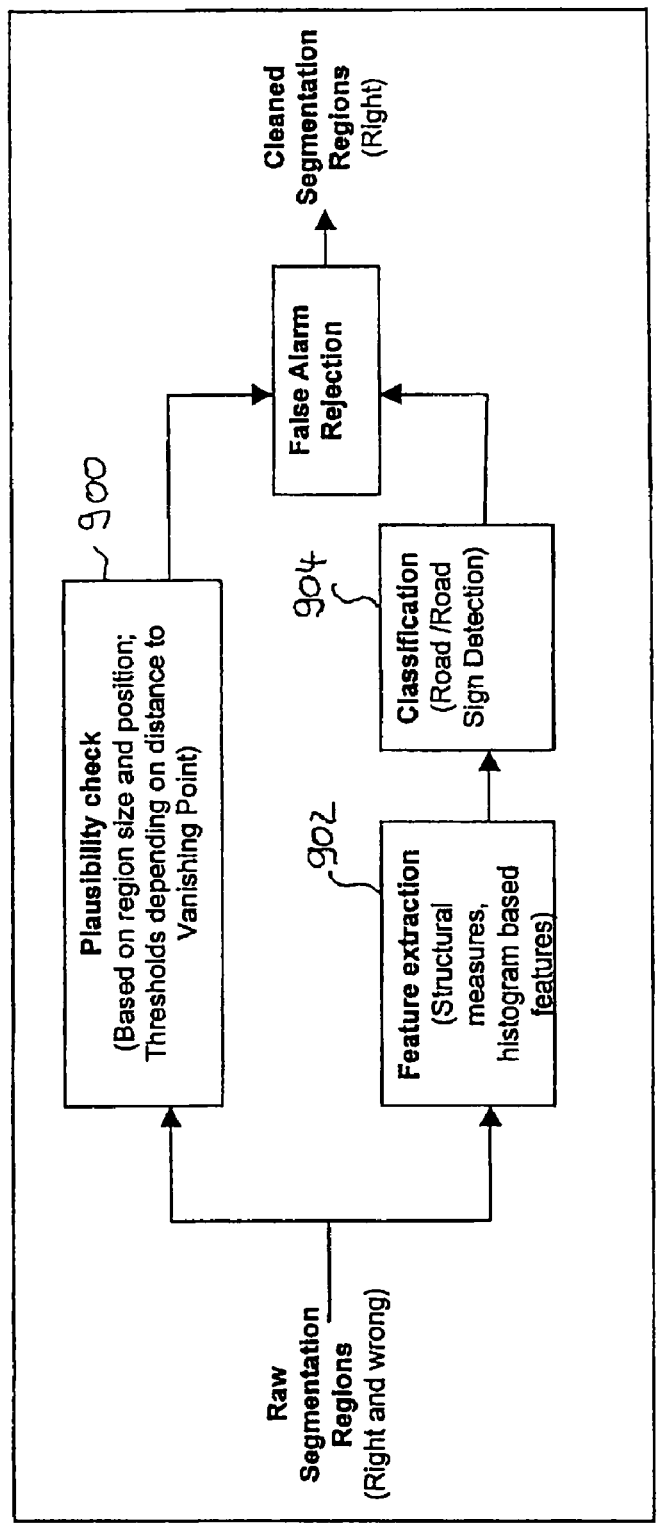
FIG. 9 shows a block diagram of an embodiment of the false alarm detection unit.

In FIG. 9 a block diagram of the false alarm rejection principle is depicted. After a raw segmentation of the regions, including right and wrong segmentations, a plausibility check 900 is performed based on a region size and position, wherein thresholds depend on the distance to the vanishing point. A feature extraction 902 based on structural measures or histogram-based features and a corresponding classification 904 are used to detect false alarms that later on are rejected in order to obtain only correct segmented regions as moving objects.

Local block-based motion estimation is used for the detection of moving objects. Detected moving objects are segmented into regions that outline the objects. Every contiguous region that consists of connected blocks is labeled with a different number, wherein a block is connected with the region if the region touches at least one of four (or eight) direct neighboring blocks. Afterwards, a loop through all these regions is used to consider every contiguous region individually. Afterwards a decision is made, which of these regions are false alarms. This decision is based on different plausibility factors.

Labeled regions with fewer blocks than a certain threshold are rejected. The threshold depends on the distance to the vanishing point where cars or vehicles are usually uncovered behind the own obstacle. Since vehicles like cars or vans have a minimum size, detected regions that are small and high above the vanishing points (background/sky) are also rejected. Expensive filtering during post-processing of the vector field can be reduced this way.

Furthermore, histogram and edge-based statistical texture measures are calculated for these areas. Based on these measures, a decision is made whether to reject the region or to further consider it. A classifier is used for the decision. Road signs, for instance, are usually represented as two high peaks in the histogram, one at higher luminance value and one at a lower luminance value, respectively. Also a Haar transform (usually used in face recognition) or other features like, for instance, variance, inter quartile range (IQR), mean, median, energy, edge energy as well as variance or mean in all histograms can be used.

Furthermore, the statistical structural measures uniformity, smoothness, third moment and entropy are used. Spectral texture features can be used to detect periodicity and the FFT (Fast Fourier Transformation) does not need not to be computed again by using phase correlation motion estimation.

Statistical moments of a gray-level histogram might be used to describe a texture of an image. If z denotes discrete random variables representing gray-levels in a range [0,L−1], and if $p(z_i)$, i=0, 1, . . . , L−1 is a normalized histogram, then the following equations apply:

A mean value m is $$m = \sum_{i=0}^{L-1} z_i p(z_i)$$

A variance σ is:

$$\sigma = \sqrt{\sum_{i=0}^{L-1} (z_i - m)^2 p(z_i)}$$

A smoothness R is:

$$R = 1 - \frac{1}{1 + \sigma^2(z)}$$

wherein R approaches 0 for areas with constant intensity (variance is close to zero), and R approaches 1 for areas with large intensity variations (variance values are large).

The third moment $\mu_3$ is:

$$\mu_3 = \sum_{i=0}^{L-1} (z_i - m)^3 p(z_i)$$

and describes the skewness of the histogram.

The uniformity U is:

$$U = \sum_{i=0}^{L-1} p(z_i)^2$$

The entropy E is:

$$E = -\sum_{i=0}^{L-1} p(z_i) \log_2 p(z_i)$$

The majority of the other false alarms can be suppressed by keeping track of their trajectory. Normally noise occurs only for short time instances and has no trajectory. For instance, a moving object is not considered a false alarm, if a number of the trajectory points of the last frames have also been detected as obstacles and the average motion of this number of frames is positive. At 30 frames per second (fps), e.g. it could be tested, whether two trajectory points of the last three frames are known. A longer history would result in a better decision but a lower response time of the system.

If a region is too large and has too many concave parts, it has to be considered further. This can easily be measured as a difference of the region surfaces and of the convex hull surface. The histogram of the motion vectors is taken for this region and the threshold is adapted.

Figure 10:
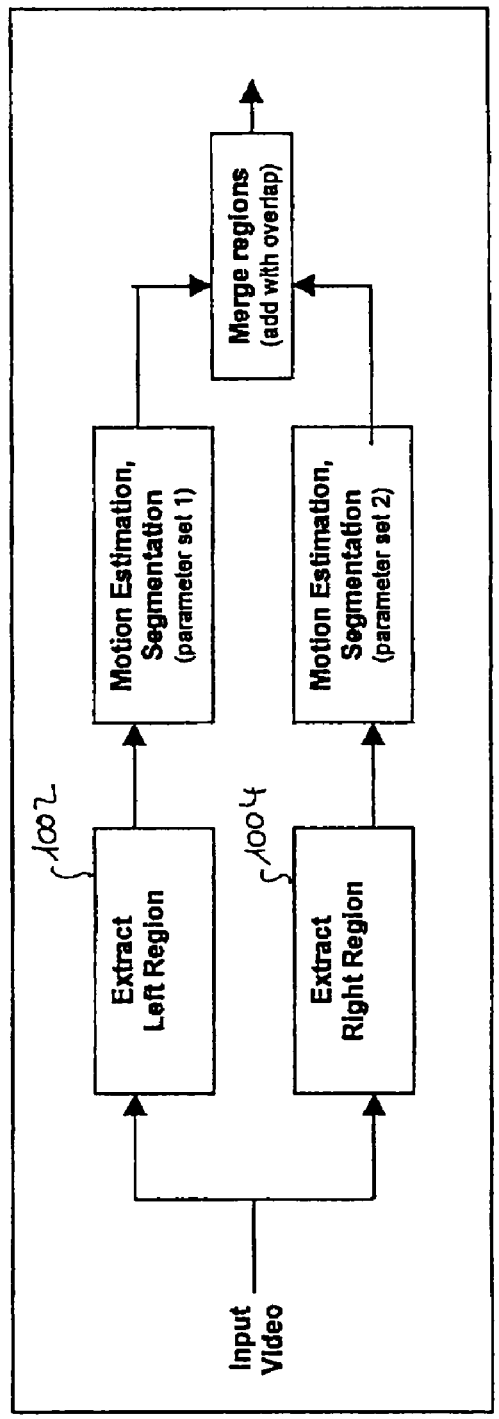
FIG. 10 shows a block diagram of an embodiment of the splitting region unit.
Figure 12:
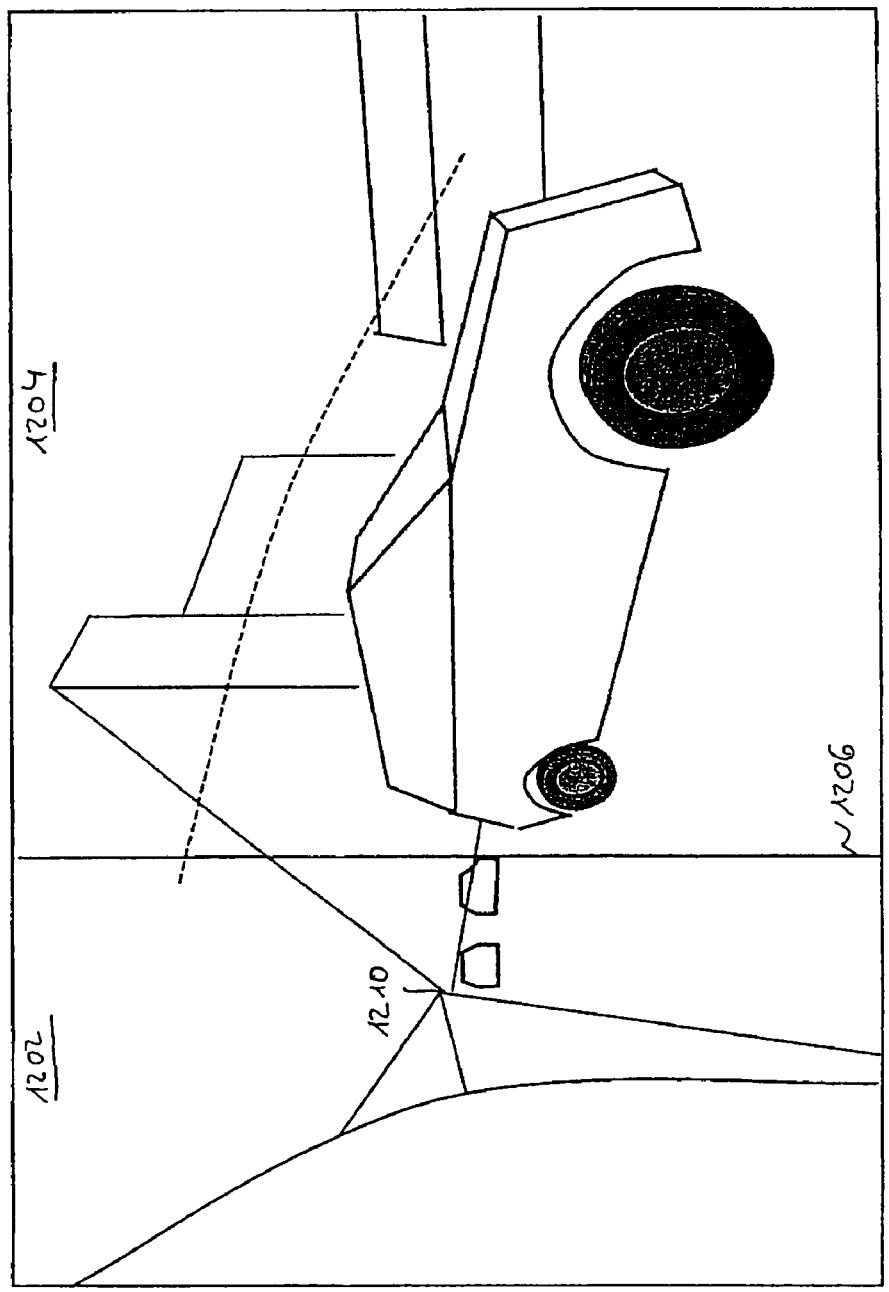
FIG. 12 shows a schematic image in order to illustrate region splitting in a further embodiment of the invention.

In FIG. 10 a block diagram of the region splitting principle is depicted. Normally the images of a sequence are similar. There are very small cars with very low motion near to the vanishing point. Sub-pixel accuracy might be very helpful here, since motion is often between zero and one pixel. At the other hand, there are very large and very fast moving objects in the right hand side of the image. Since all objects are getting smaller with higher distance (near the left vanishing point), the variance is increasing there. The sheet metals of closer cars have lower variance since they become larger (per blocks). Otherwise there is more texture near the vanishing point in the left of the image. So the images are split into at least two regions, e.g. a left region 1202 and a right region 1204, as it is depicted in FIG. 12. So the image is split into two regions (far and nearby region).

Figure 11:
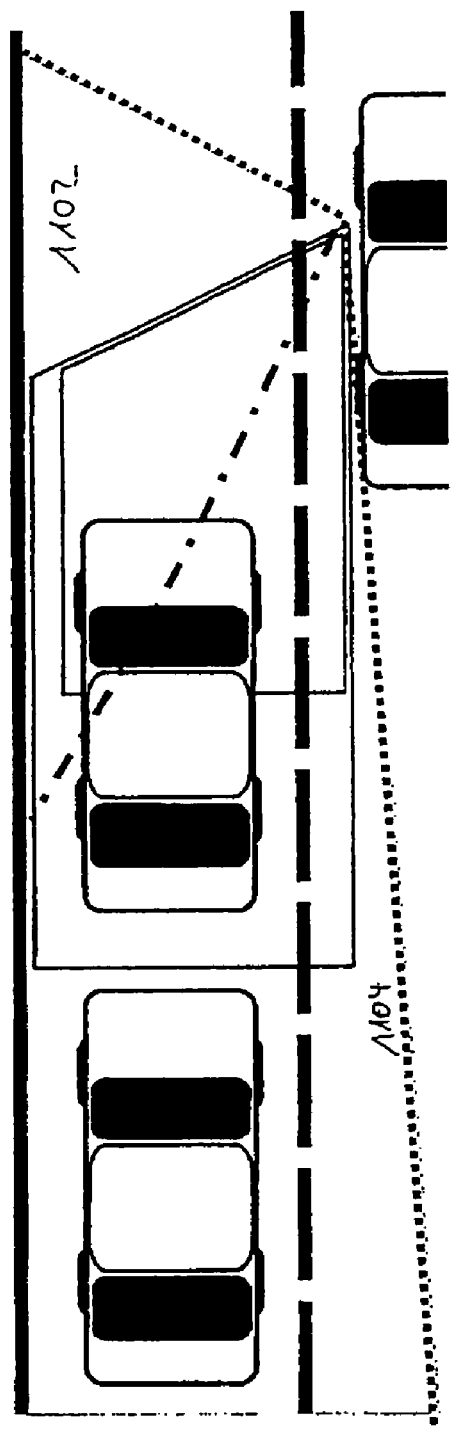
FIG. 11 shows a top view of a further embodiment of the invention, illustrating region splitting.

In FIG. 11 a top view of a split camera with slightly overlapping regions 1102 and 1104 is depicted. The location where to split (see the line 1206 in FIG. 12) depends on the camera mounting angle or the vanishing point 1210 respectively. For instance, this can be somewhere between the middle and one third of the image width. The regions might overlap slightly in order to avoid problems at the borders and for less abrupt change.

Thus, the motion estimation and all algorithms can be adapted much better to the different properties of the two regions. For instance, the search range of the motion estimation may be adapted to the region. The search region and the match block size in the right area 1204 are lower than in the left region 1202.

The training data for the classification is different in the regions because of the changed perspective. Obstacles as moving objects in the left area 1202 is seen from the front, whereas obstacles in the right area 1204 are seen from the side.

Figure 13:
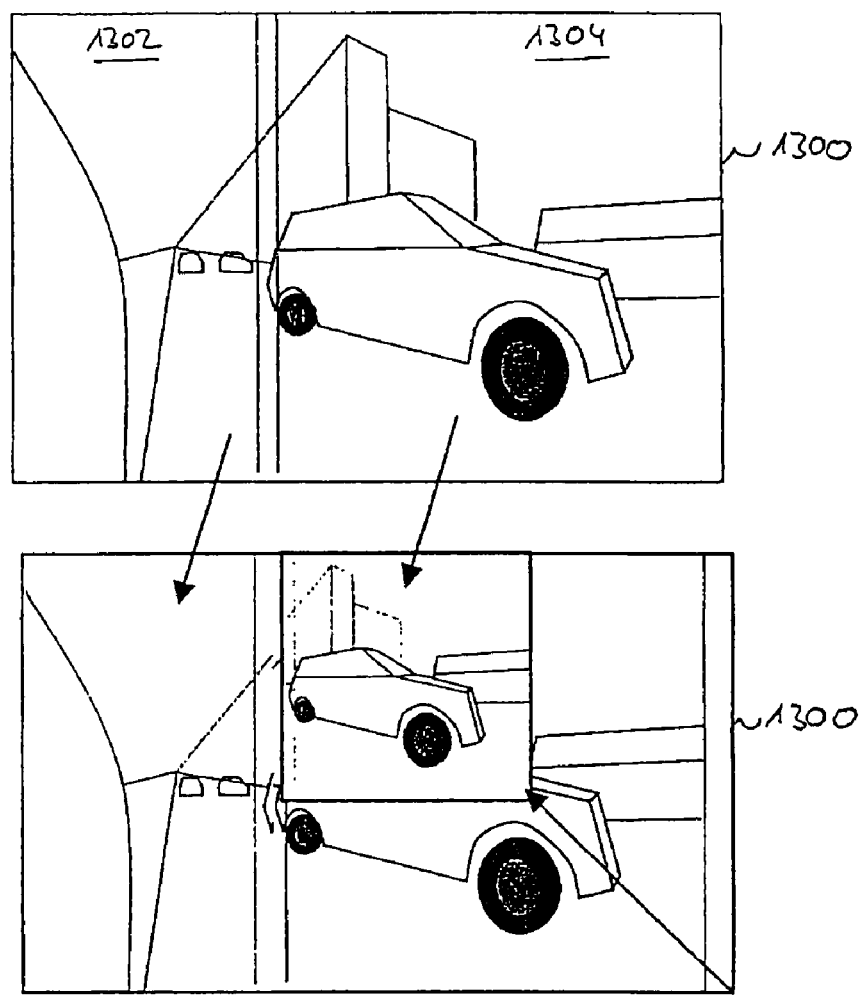
FIG. 13 illustrates schematically different scaling processes in different regions according to a further embodiment of the invention.

As it is depicted in FIG. 13 an image 1300, which is split into two regions 1302 and 1304 can be further processed, by up-sampling or down-sampling the number of pixels. Since the structures in the right region 1304 are rather large the down-sampling can be performed in order to reduce computation time. Whereas in the left region 1302 an up-scaling can be performed to allow sub-pixel accuracy. The results of these regions can be later on merged again.

The monocular passive blind spot detection is based on motion estimation (block-based) where conventional approaches usually have problems. With the proposed method and device false alarms can successfully rejected based on the abovementioned criteria, and the large search range and motion model related problems can be handled using splitting of regions. So the system performance, accuracy and reliability may be improved. Additionally to the performance improvement the splitting of regions reduces the computation cost (search range).

The monocular camera just needs one camera, whereas stereo approaches need an expensive second camera and difficult depth estimation. The proposed device and method is completely passive, which makes it very cheap and no interference with other active sensors can occur. The system can handle monochrome as well as color images.

Figure 14:
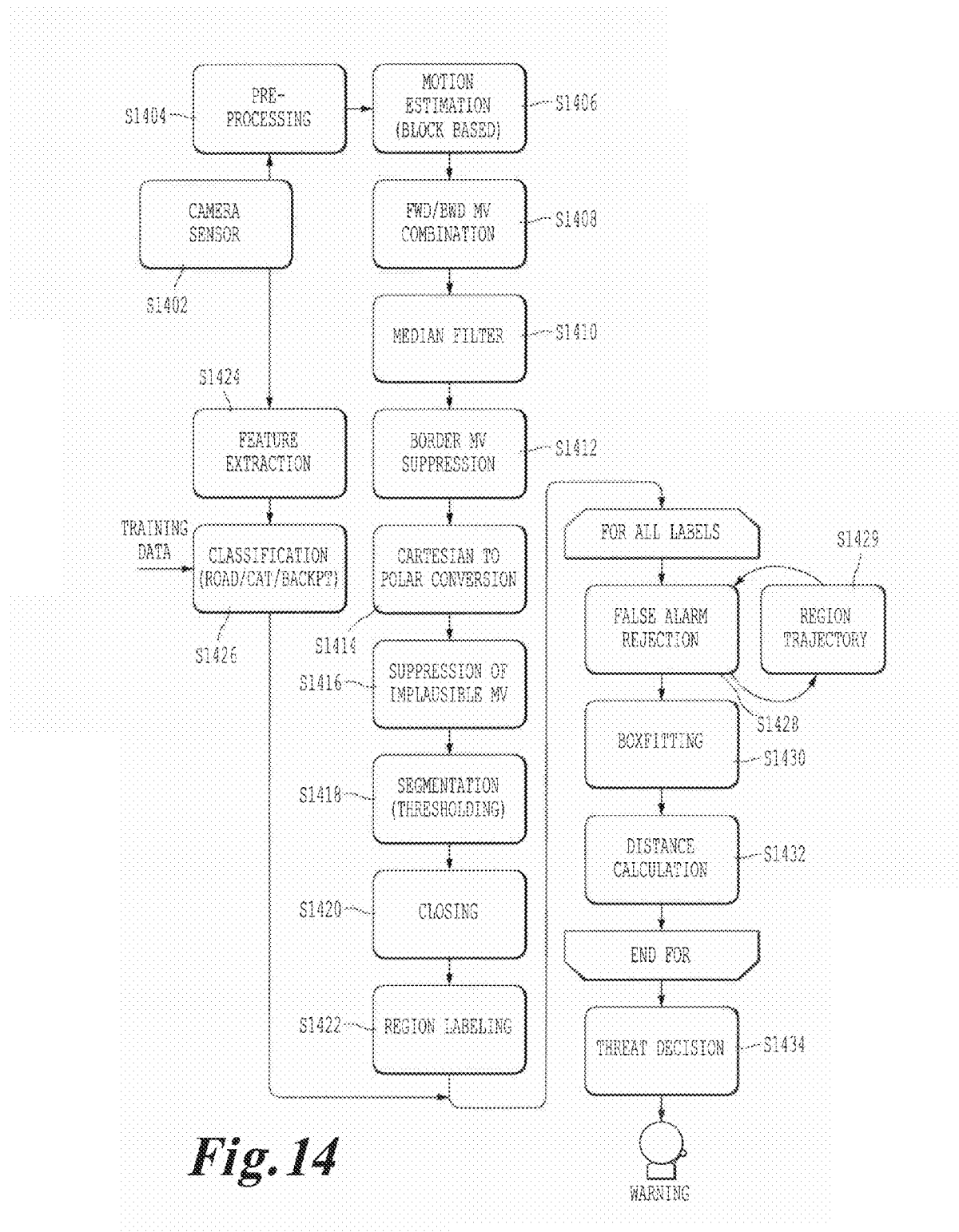
FIG. 14 shows a detailed block diagram of still another embodiment of the invention.

In FIG. 14 an overview of the proposed method is depicted. A camera sensor S1402 takes a sequence of images which are afterwards pre-processed in a step S1404, e.g. a filtering step. Afterwards a block-based motion estimation is performed in step S1406, wherein in a step S1408 the forward/backward motion vector combination is used, to which in a next step S1410 a median filter is applied. Border motion vectors are suppressed in a next step S1412 and a transformation of Cartesian to polar coordinates is performed in the next step S1414. Implausible motion vectors are suppressed in a next step S1416 and afterwards a segmentation or a grouping of blocks with similar motion vectors is performed in a step S1418. The objects are closed in a step S1420 and the corresponding regions are labeled in a step S1422. In a step S1424 a feature extraction is performed on a sequence of images taken by the camera sensor S1402 and the features are classified in the next step S1426 with the help of training data. The result of the classification in step S1426 and the result of the labeling of regions in step S1422 are combined so that for all labels a false alarm rejection step S1428 is performed thereby taking into account a region trajectory in a step S1430. Afterwards a box fitting in a step S1430 and a distance calculation in a step S1432 is performed for all labels so that afterwards a flat decision in a step S1434 can be performed.

The invention claimed is:

1. A method for detecting moving objects in a blind spot region of a vehicle, comprising:
   taking a sequence of images of said blind spot region;
   partitioning each of said images of said sequence into blocks;
   identifying moving blocks which have performed a movement between consecutive images of said sequence;
   determining a direction and a distance of said movement of said moving blocks;
   splitting said images of said sequence into at least two regions;
   segmenting said images by grouping adjacent moving blocks, for which directions within a predetermined direction interval and distances within a predetermined distance interval have been determined, wherein different criteria are used for said segmenting in said at least two regions; and
   determining said moving objects based on said step of segmenting.

2. The method according to claim 1, further comprising:
   determining at least one false alarm among said moving objects; and
   generating an alarm if at least one of said moving objects is not a false alarm.

3. The method according to claim 2, further comprising:
   determining an object size of said moving object;
   comparing said object size with a predetermined size; and
   generating said false alarm if said object size is smaller than said predetermined size.

4. The method according to claim 3, further comprising:
   determining a vanishing point within said images, wherein said predetermined size depends on a distance of said moving object from said vanishing point.

5. The method according to claim 2, further comprising:
   identifying a vanishing point within said images;
   determining an object size of said moving object;
   determining a vertical distance of said moving object from said vanishing point; and generating said false alarm, if said object size is below a predetermined object size and if said vertical distance is above a predetermined distance.

6. The method according to claim 2, further comprising:
evaluating a trajectory of said moving object; and
generating said false alarm based on said step of evaluating.

7. The method according to claim 2, further comprising:
determining a size of said moving object;
calculating a difference between a region surface and a convex hull if said size is greater than a predetermined size; and
redefining said moving objects, if said difference is above a predetermined difference.

8. The method according to claim 1, wherein a different search region and/or a different matchblock size are used as said different criteria.

9. The method according to claim 1, further comprising:
identifying moving objects in said at least two regions using different training data.

10. The method according to claim 1, further comprising:
upscaling or downscaling images differently in said at least two regions.

11. The method according to claim 2, further comprising:
identifying false alarms within different regions using different thresholds.

12. The method according to claim 1, wherein in said step of splitting,
said images of said sequence is split into two regions.

13. A computer program product including a non-transitory computer readable medium encoded thereon with a computer program code, which when executed by a processor causes the processor to perform the method according to claim 1.

14. The method according to any of claims 2 to 5, further comprising:
calculating a histogram and/or edge based statistical measure of at least one of said moving objects;
evaluating said histogram and/or edge based statistical measure; and
generating said false alarm based on said step of evaluating.

15. The method according to claim 14, wherein said statistical measure is a variance, an inter quartier range, a mean, a median, an energy, an edge energy, a uniformity, a smoothness, a third moment and/or an entropy.

16. A blind spot detection device for a vehicle, comprising:
a camera configured to take a sequence of images of said blind spot region;
a splitting region unit configured to split said images of said sequence into at least two regions;
a processor configured
to partition each of said images of said sequence into blocks,
to identify moving blocks which have performed a movement between consecutive images of said sequence,
to determine a direction and a distance of said movement of said moving blocks,
to segment said images by grouping adjacent moving blocks, for which directions within a predetermined direction interval and distances within a predetermined distance interval have been determined, wherein different criteria are used for said segmenting in said at least two regions, and
to determine moving objects; and
an indicator configured to indicate a dangerous situation, if a moving object in said blind spot has been detected.

17. The blind spot detection device according to claim 16, further comprising:
a false alarm rejection unit, connected to said processor and to said indicator, and being configured to identify false alarms among said moving objects, wherein
said indicator is further configured to generate an alarm if at least one of said moving objects is not a false alarm.

18. The blind spot detection device according to claim 16 or 17, further comprising:
an active sensor configured to determine a distance to said moving object.

* * * * *